US012759182B2

(12) United States Patent
Rudenstam et al.

(10) Patent No.: US 12,759,182 B2
(45) Date of Patent: Oct. 13, 2026

(54) HANDHELD POWER TOOL

(71) Applicant: HUSQVARNA AB, Huskvarna (SE)

(72) Inventors: Carl Rudenstam, Huskvarna (SE); Joakim Samefors, Huskvarna (SE); Kevin Sundin, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 19/159,052

(22) PCT Filed: Jan. 12, 2024

(86) PCT No.: PCT/SE2024/050025
§ 371 (c)(1),
(2) Date: Aug. 22, 2025

(87) PCT Pub. No.: WO2024/177543
PCT Pub. Date: Aug. 29, 2024

(65) Prior Publication Data

US 2026/0216910 A1 Jul. 30, 2026

(30) Foreign Application Priority Data

Feb. 23, 2023 (SE) .................................... 2350205-7

(51) Int. Cl.
*B27B 17/12* (2006.01)

(52) U.S. Cl.
CPC .................................... *B27B 17/12* (2013.01)

(58) Field of Classification Search
CPC ...................................................... B27B 17/12
See application file for complete search history.

(56) References Cited

U.S. PATENT DOCUMENTS 4,016,956 A * 4/1977 Karlsson ................. B27B 17/12
184/32
4,534,005 A * 8/1985 Nagashima ............... F16N 7/38
700/282

(Continued)

FOREIGN PATENT DOCUMENTS

CN 204922462 U 12/2015
CN 205130048 U 4/2016

(Continued)

OTHER PUBLICATIONS

Office Action and Search Report for Swedish Application No. 2350205-7 mailed on Nov. 22, 2023.

(Continued)

*Primary Examiner* — Lucas E. A. Palmer
(74) *Attorney, Agent, or Firm* — Burr & Forman

(57) ABSTRACT

A handheld power tool (40) is disclosed comprising a power source (38) configured to power a tool (30) of the handheld power tool (40) and a lubrication pump (1). The lubrication pump (1) comprises a pump chamber unit (4) comprising a pump chamber (4') with an inlet (11) connected to the lubricant tank (2) and an outlet (12) connected to the lubrication portion (3), a pump member (5') arranged inside the pump chamber unit (4), and an electric motor unit (6) configured to rotate the pump member (5') relative to the pump chamber unit (4) such that the pump member (5') pumps lubricant from the inlet (11) to the outlet (12). The handheld power tool (40) further comprises a sensor assembly (7) configured to provide data indicative of the rotational position of the pump member (5') relative to the pump chamber unit (4).

18 Claims, 2 Drawing Sheets

(56) References Cited

U.S. PATENT DOCUMENTS

| | | | | |
|---|---|---|---|---|
| 5,411,382 | A * | 5/1995 | Duensing | B27B 17/12 417/500 |
| 5,560,345 | A * | 10/1996 | Geyer | B27B 17/00 123/516 |
| 10,259,135 | B2 | 4/2019 | Pellenc | |
| 12,137,641 | B2 * | 11/2024 | McCue | A01G 3/086 |
| 2009/0013536 | A1 * | 1/2009 | Kaiser | B25F 5/008 30/123.3 |
| 2010/0043234 | A1 * | 2/2010 | Pellenc | B27B 17/12 30/515 |
| 2011/0005088 | A1 | 1/2011 | Pellenc | |
| 2013/0206022 | A1 * | 8/2013 | Bungter | B25B 27/10 100/50 |
| 2013/0248294 | A1 * | 9/2013 | Kettunen | A01G 23/091 184/26 |
| 2014/0037482 | A1 * | 2/2014 | Hirai | B27B 17/12 417/500 |
| 2015/0336288 | A1 | 11/2015 | Hallendorff et al. | |
| 2017/0072584 | A1 * | 3/2017 | Pellenc | B27B 17/02 |
| 2018/0052034 | A1 * | 2/2018 | Ellwein | F01M 11/061 |
| 2018/0230997 | A1 | 8/2018 | Dearden | |
| 2019/0111582 | A1 * | 4/2019 | Suzuki | B27B 17/12 |
| 2019/0202079 | A1 * | 7/2019 | Ferrari | B27B 17/12 |
| 2021/0252657 | A1 | 8/2021 | Nakano et al. | |
| 2021/0402219 | A1 * | 12/2021 | Sauerbier | A62B 3/005 |
| 2022/0030782 | A1 * | 2/2022 | Puoskari | F16N 19/00 |
| 2023/0191581 | A1 * | 6/2023 | Ballard | B25B 27/146 173/1 |
| 2024/0165845 | A1 * | 5/2024 | Paul | B27B 17/12 |

FOREIGN PATENT DOCUMENTS

| | | | | | |
|---|---|---|---|---|---|
| CN | 110663005 | A | * | 1/2020 | G05B 19/0405 |
| CN | 211146048 | U | | 7/2020 | |
| CN | 216306204 | U | | 4/2022 | |
| DE | 202004018603 | U1 | | 4/2006 | |
| EP | 1932555 | A1 | | 6/2008 | |
| EP | 3162519 | A1 | | 5/2017 | |
| GB | 2541031 | A | | 2/2017 | |
| JP | 2015098113 | A | | 5/2015 | |
| KR | 20240086893 | A | * | 6/2024 | B23D 59/00 |
| WO | WO-2024177543 | A1 | * | 8/2024 | B27B 17/12 |

OTHER PUBLICATIONS

International Search Report and Written Opinion for International Application No. PCT/SE2024/050025 mailed Apr. 19, 2024.

* cited by examiner

HANDHELD POWER TOOL

TECHNICAL FIELD

The present disclosure relates to a handheld power tool comprising a lubrication system configured to lubricate a tool of the handheld power tool.

BACKGROUND

A handheld power tool is a tool intended to be supported by one or two hands of a user during operation. Moreover, a handheld power tool comprises a tool which can be driven by a power source other than solely manual labour. The power source may for example comprise a combustion engine, an electric motor, a pneumatic motor, or the like.

Today, there are many kinds of power tools available on the market. Examples are chain saws, circular saws, trimmers, hedge trimmers, multi-tools, and the like. Power tools are for example used in industry, in construction, in gardens, for housework tasks, and around houses for purposes of cutting, shaping, sanding, grinding, routing, polishing, and the like.

Some handheld power tools, such as chain saws, comprise a lubrication system configured to lubricate the tool of the handheld power tool. Normally, such a lubrication system comprises a lubricant tank and a lubrication pump configured to pump lubricant from the lubricant tank to a lubrication portion to lubricate the tool. In many cases, the lubrication pump comprises a worm gear connected to a drive shaft of the power source of the handheld power tool. In this manner, the lubrication pump is driven to operate when the power source is operating.

Moreover, in these types of solutions, the rotational speed of the lubrication pump follows the rotational speed of the power source of the lubrication pump such that the pumping rate of lubricant from the lubricant tank to the lubrication portion can at least substantially follow the rotation speed of the power source of the handheld power tool. Moreover, in some solutions, a maximum rotation speed of the lubrication pump can be adjusted via an adjustment screw between a number of different settings.

These types of lubrication systems are robust and work in most weather conditions. However, they are also associated with some problems and drawbacks as specified below.

One problem is the controllability of the flowrate of lubricant to the lubrication portion. That is, as mentioned above, in some prior-art solutions, the maximum flowrate of lubricant delivered by the lubrication pump can be adjusted via an adjustment screw between a number of settings. The maximum flowrate of lubricant delivered by the lubrication pump is obtained when the power source of the handheld power tool is operating at full speed and the adjustment of the setting is normally performed during stand-still of the handheld power tool. This means that the tool might not get enough lubricant or too much lubricant during use.

A too low flowrate of lubricant delivered by the lubrication pump may cause excessive wear and tear of the tool of the handheld power tool as well as excessive temperatures of the tool. Moreover, insufficient lubrication of the tool may lower the efficiency of the tool and may cause a higher energy/fuel consumption.

On the other hand, a too high flowrate of lubricant delivered by the lubrication pump causes excessive consumption of lubricant from the lubricant tank meaning that a user must refill the lubricant tank with lubricant earlier than would be the case otherwise which can be costly and burdensome for the user. Furthermore, a too high flowrate of lubricant delivered by the lubrication pump can cause splashing of lubricant from the tool during operation thereof. For these reasons, an excessive flowrate of lubricant delivered by the lubrication pump can have a negative impact on the environment. Moreover, if the lubricant tank is emptied of lubricant due to an excessive consumption of lubricant during operation of the handheld power tool, the tool will not be lubricated which can cause excessive wear, tear, and damage of the tool, as well as excessive temperatures thereof.

Moreover, the viscosity of most lubricants increases with decreased temperatures. This means that the lubricant is harder to pump at low temperatures and the flowrate of lubricant will reduce as a result thereof. On handheld power tools comprising an internal combustion engine, the lubricant will warm up quite quickly due to heat dissipated from the engine to the lubricant. However, in a handheld power tool comprising a power source in the form an electric motor, less heat is available for heating the lubricant and the lubricant will have a high viscosity for a longer period of time.

Another problem associated with lubrication systems of handheld power tools is leaking of lubricant. Such leaking of lubricant can occur through a lubrication pump of the lubrication system of the handheld power tool when storing the handheld power tool, especially when the handheld power tool is subjected to changes in temperature. In many cases, the lubricant tank can be fully drained by such a leakage. If so, the lubricant tank must be refilled before operating the handheld power tool which is costly and burdensome for the user. Moreover, cleaning of lubricant having leaked from the handheld power tool can be burdensome for users.

SUMMARY

It is an object of the present invention to overcome, or at least alleviate, at least some of the above-mentioned problems and drawbacks.

According to an aspect of the invention, the object is achieved by a handheld power tool comprising a power source configured to power a tool of the handheld power tool and a lubrication system, wherein the lubrication system comprises a lubricant tank and lubrication pump configured to pump lubricant from the lubricant tank to a lubrication portion to lubricate the tool. The lubrication pump comprises a pump chamber unit comprising a pump chamber with an inlet connected to the lubricant tank and an outlet connected to the lubrication portion, a pump member arranged inside the pump chamber unit, and an electric motor unit configured to rotate the pump member relative to the pump chamber unit such that the pump member pumps lubricant from the inlet to the outlet. The handheld power tool further comprises a sensor assembly configured to provide data indicative of the rotational position of the pump member relative to the pump chamber unit.

Since the handheld power tool comprises the sensor assembly, conditions are provided for a more accurate control of the electric motor and thus also of the pumping rate of lubricant delivered by the lubrication pump. Accordingly, in this manner, a more accurate control can be provided of the pumping rate of lubricant from the lubricant tank to the lubrication portion so as to avoid too high or too low flowrates of lubricant delivered to the lubrication portion.

Furthermore, since the handheld power tool comprises the lubrication system, conditions are provided for controlling the electric motor unit to position the pump member within a predetermined position range within the pump chamber so as to reduce the probability of leakages through the lubrication pump during stand-stills of the handheld power tool.

Accordingly, a handheld power tool is provided overcoming, or at least alleviating, at least some of the above-mentioned problems and drawbacks. As a result, the above-mentioned object is achieved.

Optionally, the handheld power tool further comprises a control arrangement connected to the sensor assembly and to the electric motor unit, and wherein the control arrangement is configured to control operation of the electric motor unit based on the data from the sensor assembly. Thereby, an accurate control of the electric motor unit and thus also of the pumping rate of lubricant delivered by the lubrication pump can be provided.

Optionally, the control arrangement is configured to determine a current rotational speed of the pump member using the data from the sensor assembly upon rotation of the pump member, obtain a desired rotational speed of the pump member, and control a power output of the electric motor unit such that the rotational speed of the pump member is controlled towards the desired rotational speed of the pump member. Thereby, an accurate control of the electric motor unit and thus also of the pumping rate of lubricant delivered by the lubrication pump is obtained. Accordingly, in this manner, too high or too low flowrates of lubricant delivered to the lubrication portion can be avoided during operation of the handheld power tool.

Moreover, conditions are provided for obtaining a more consistent flowrate of lubricant from the lubrication pump to the lubrication portion being less dependent on a current viscosity of the lubricant. This is because if the viscosity of the lubricant is high, it will increase the pumping resistance faced by the pump member which tends to decrease the rotational speed of the pump member. However, since the control arrangement according to these embodiments is configured to control the power output of the electric motor unit such that the rotational speed of the pump member is controlled towards the desired rotational speed of the pump member, such a decreased rotational speed of the pump member can be counteracted for to obtain a more consistent flowrate of lubricant being less dependent on the viscosity of the lubricant.

Likewise, in case the viscosity of the lubricant is low, the pumping resistance faced by the pump member is low which tends to increase the rotational speed of the pump member. However, since the control arrangement according to these embodiments is configured to control the power output of the electric motor unit such that the rotational speed of the pump member is controlled towards the desired rotational speed of the pump member, such an increased rotational speed of the pump member can be counteracted for to obtain a more consistent flowrate of lubricant being less dependent on the viscosity of the lubricant.

As a further result, a handheld power tool is provided capable of obtaining a proper lubrication of the tool at various operation temperatures. Moreover, proper lubrication of the tool can be ensured also in embodiments in which the power source of the handheld power tool comprises an electric motor as well as in situations in which the handheld power tool is operated at low temperatures.

Optionally, the control arrangement is configured to increase the power output of the electric motor unit in case the current rotational speed is below the desired rotational speed and is configured to reduce the power output of the electric motor unit in case the current rotational speed is above the desired rotational speed. Thereby, an accurate control of the power output of the electric motor unit is obtained so as to ensure a consistent flowrate of lubricant from the lubrication pump.

Optionally, the control arrangement is configured to obtain at least one parameter indicative of a current lubrication need of the tool and determine the desired rotational speed of the pump member based on the obtained at least one parameter. Thereby, an accurate control of the lubrication of the tool of the handheld power tool is provided based on the current lubrication need of the tool. In this manner, it can be ensured that too high or too low flowrates of lubricant delivered to the lubrication portion is avoided during operation of the handheld power tool.

Optionally, the at least one parameter is indicative of a current operational condition of the power source of the handheld power tool. Thereby, a simple and accurate control is provided of the lubrication of the tool of the handheld power tool in a manner being less dependent on the viscosity of the lubricant.

Optionally, the control arrangement is configured to, upon receipt of a stop demand of the lubrication pump, control the electric motor unit to rotate the pump member to assume an angle relative to the pump chamber unit being within a predetermined angle interval.

Thereby, conditions are provided for avoiding leakage of lubricant from the handheld power tool via the lubrication pump in an efficient manner when storing the handheld power tool. In this manner, the consumption of lubricant can be reduced and a more user-friendly handheld power tool can be provided.

This is because studies have shown that a leakage rate through the lubrication pump can depend on the position of the pump member relative to the pump chamber unit. In prior-art solutions, the stop position of the pump member relative to the pump chamber unit is at least substantially random meaning that the pump member in many cases is stopped at a position relative to the pump chamber unit in which a significant leakage of lubricant is obtained over the lubrication pump. However, by controlling the electric motor unit to rotate the pump member to assume an angle relative to the pump chamber unit being within the predetermined angle interval upon receipt of the stop demand, such leakages of lubricant can be avoided.

Optionally, the pump chamber unit comprises an inlet port connected to the inlet and an outlet port connected to the outlet, and wherein the pump member comprises a mantle surface configured to cover and uncover the inlet port and the outlet port respectively upon rotation of the pump member. Thereby, a handheld power tool is provided comprising a mechanically simple lubrication pump while having conditions for obtaining a more accurate control of the pumping rate of lubricant delivered by the lubrication pump as well as conditions for controlling the electric motor unit to position the pump member within a predetermined position range relative to the pump chamber unit so as to reduce the probability of leakages through the lubrication pump during stand-stills of the handheld power tool.

Optionally, the mantle surface of the pump member is configured to cover the inlet port when the pump member is at an angle relative to the pump chamber unit being within the predetermined angle interval. Thereby, it can be ensured that leakage of lubricant from the handheld power tool via the lubrication pump is avoided in an efficient manner when storing the handheld power tool. That is, studies have shown that leakage of lubricant through a lubrication pump usually occurs when the inlet port of the lubrication pump is open, i.e., is uncovered. Thus, by controlling the electric motor unit to rotate the pump member to assume an angle relative to the pump chamber unit in which the mantle surface of the pump member covers the inlet port, such leakages of lubricant can be avoided.

Optionally, the lubrication pump comprises a plunger unit comprising the pump member, and wherein the plunger unit is rotationally arranged relative to the pump chamber unit around a rotation axis, and wherein the lubrication pump comprises a mechanism configured to force the plunger unit to reciprocate relative to the pump chamber unit along directions coinciding with the rotation axis upon rotation of the plunger unit relative to the pump chamber unit.

Thereby, a handheld power tool is provided comprising a mechanically simple lubrication pump while having conditions for obtaining a more accurate control of the pumping rate of lubricant delivered by the lubrication pump as well as conditions for controlling the electric motor unit to position the pump member within a predetermined position range relative to the pump chamber unit so as to reduce the probability of leakages through the lubrication pump during stand-stills of the handheld power tool.

Moreover, as compared to a lubrication pump comprising a worm gear, a lubrication pump can be provided generating less noise during operation.

Optionally, the mechanism is formed by a groove on one of the plunger unit and the pump chamber unit and a protrusion arranged on the other of the plunger unit and the pump chamber unit, wherein the protrusion protrudes into the groove, and wherein the groove is angled relative to a plane perpendicular to the rotation axis. Thereby, a handheld power tool is provided comprising a mechanically simple lubrication pump while having conditions for obtaining a more accurate control of the pumping rate of lubricant delivered by the lubrication pump as well as conditions for avoiding leakages through the lubrication pump during stand-still of the handheld power tool.

Optionally, the lubrication pump comprises a connector connecting an output shaft of the electric motor unit and the plunger unit. Thereby, a handheld power tool is provided comprising a mechanically simple lubrication pump while having conditions for obtaining a more accurate control of the pumping rate of lubricant delivered by the lubrication pump as well as conditions for controlling the electric motor unit to position the pump member within a predetermined position range relative to the pump chamber unit so as to reduce the probability of leakages through the lubrication pump during stand-stills of the handheld power tool.

Optionally, an end section of the plunger unit protrudes into an aperture of the connector, and wherein the aperture and the end section together form an interface rotationally locking the plunger unit to the connector while allowing movement of the plunger unit relative to the connector along directions coinciding with the rotation axis of the plunger unit. Thereby, a handheld power tool is provided comprising a mechanically simple lubrication pump while having conditions for obtaining a more accurate control of the pumping rate of lubricant delivered by the lubrication pump as well as conditions for avoiding leakages through the lubrication pump during stand-stills of the handheld power tool.

Optionally, the sensor assembly comprises a sensor configured to sense the magnitude of a magnetic field and a magnet arranged on a portion of the lubrication pump, and wherein the portion of the lubrication pump is arranged to rotate with the pump member. Thereby, a simple, efficient, and reliable sensor assembly is provided capable of providing data indicative of the rotational position of the pump member relative to the pump chamber unit. Optionally, the portion of the lubrication pump is a portion of the connector. Thereby, the data indicative of the rotational position of the pump member relative to the pump chamber unit can be provided in a simple, efficient, and reliable manner. Moreover, a structurally simple sensor assembly can be provided.

Optionally, the sensor is a Hall effect sensor. Thereby, the data indicative of the rotational position of the pump member relative to the pump chamber unit can be provided in a simple, efficient, and reliable manner.

Optionally, the electric motor unit comprises an electric motor and a gearbox, wherein the gearbox connects an output shaft of the electric motor and an output shaft of the electric motor unit. Thereby, conditions are provided for a strong and reliable electric motor unit.

Optionally, the handheld power tool is a chainsaw or a hedge trimmer. Thereby, a chainsaw or a hedge trimmer is provided having at least some of the above-mentioned advantages.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like reference signs refer to like elements throughout. Well-known functions or constructions will not necessarily be described in detail for brevity and/or clarity.

Figure 1:
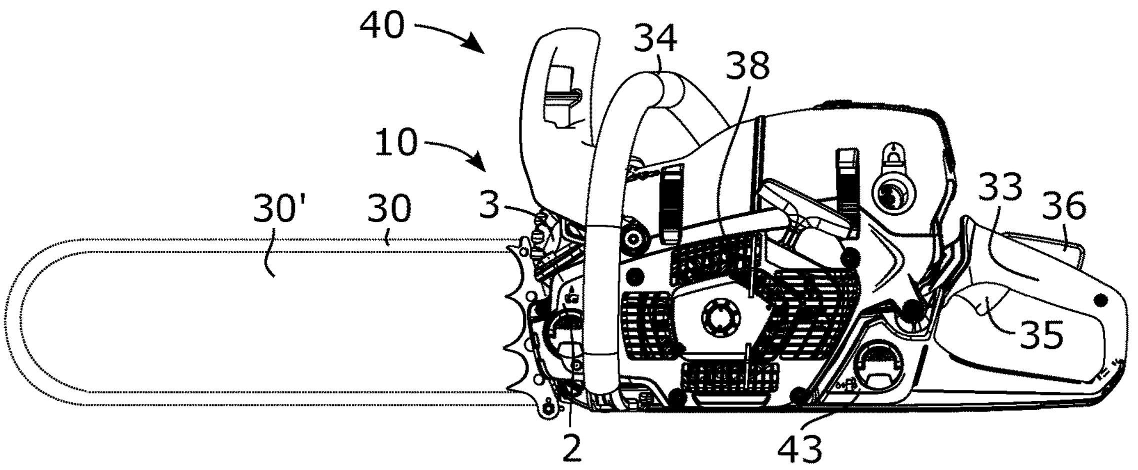
FIG. 1 illustrates a handheld power tool according to some embodiments.

FIG. 1 illustrates a handheld power tool 40 according to some embodiments of the present disclosure. The handheld power tool 40 comprises a tool 30 and a power source 38 configured to power the tool 30. According to the illustrated embodiments, the handheld power tool 40 is a chainsaw comprising a tool 30 in the form of a cutting chain movably arranged around a guide bar 30'. In FIG. 1, the cutting chain and the guide bar 30' are schematically illustrated.

The power source 38 is configured to rotate the cutting chain around the guide bar 30' during operation of the handheld power tool 40. According to further embodiments, the handheld power tool 40, as referred to herein, may be another type of handheld power tool 40 than a chainsaw, such as for example a hedge trimmer. Obviously, according to such embodiments, the handheld power tool 40 may comprise another type of tool 30 than a cutting chain, such as for example a hedge trimmer cutting assembly.

According to the illustrated embodiments, the power source 38 is an internal combustion engine. In more detail, according to the illustrated embodiments, the power source 38 is a small sized two-stroke internal combustion engine. The handheld power tool comprises a fuel tank 43 configured to store fuel which is supplied to the internal combustion engine during operation thereof. The internal combustion engine of the handheld power tool 40 may be configured to run on gasoline, also referred to as petrol, alcohol, similar volatile fuels, or combinations thereof.

According to some further embodiments, the handheld power tool 40 may comprise another type of power source, such as an electric motor. According to such embodiments, the handheld power tool 40 may comprise an electric battery for supplying electricity to the electric motor during operation thereof. As an alternative, or in addition, the handheld power tool 40 may comprise another type of device for supplying electricity to the electric motor during operation thereof, such as a connector for connecting the electric motor to an electric power cord.

The handheld power tool 40 comprises a first handle 33 and a second handle 34. The second handle 34 is separate from the first handle 33 and is arranged at a distance from the first handle 33. The handheld power tool 40 is configured to be supported via each of the first and second handles 33, 34 during operation of the handheld power tool 40. In other words, the handheld power tool 40 is configured to be supported by two hands of a user during operation of the handheld power tool 40, i.e., is configured to be supported by one hand grabbing the first handle 33 and the other hand grabbing the second handle 34.

According to the illustrated embodiments, the first handle 33 is a rear handle arranged at a rear portion of the handheld power tool 40 and the second handle 34 is a so-called front handle. According to the illustrated embodiments, the second handle 34 is arranged closer to the tool 30 of the handheld power tool 40 than the first handle 33. Moreover, the second handle 34 is arranged at a position between the tool 30 of the handheld power tool 40 and the first handle 33 of the handheld power tool 40. According to the illustrated embodiments, the second handle 34 is formed by an elongated curved-shaped body allowing a user to grip the second handle 34 from various directions in a convenient manner. Thereby, a user is allowed to operate the handheld power tool 40 at different orientations relative to the gravitational field in a convenient and safe manner.

The handheld power tool 40 comprises a throttle actuator 35 arranged at the first handle 33. The throttle actuator 35 can be used to control a power output of the power source 38. The handheld power tool 40 further comprises a safety actuator 36 arranged at the first handle 33. The safety actuator 36 is operably connected to a mechanism preventing actuation of the throttle actuator 35 when the safety actuator 36 not is pressed and allowing actuation of the throttle actuator 35 when the safety actuator 36 is pressed.

According to the illustrated embodiments, the safety actuator 36 is arranged to be pressed by the palm of a hand of a user whereas the throttle actuator 35 is arranged to be actuated, i.e., pressed, by one or more fingers of the hand of a user.

The handheld power tool 40 comprises a lubrication system 10 configured to lubricate the tool 30 of the handheld power tool 40. As mentioned, according to the illustrated embodiments, the handheld power tool 40 is a chainsaw comprising a tool 30 in the form of a cutting chain movably arranged around a guide bar 30'. Therefore, according to the illustrated embodiments, the lubrication system 10 is configured to lubricate an interface between the cutting chain and the guide bar 30'.

The lubrication system 10 comprises a lubricant tank 2 configured to accommodate lubricant, such as oil. Moreover, as is further explained herein, the lubrication system 10 comprises a lubrication pump configured to pump lubricant from the lubricant tank 2 to a lubrication portion 3 to lubricate the tool 30. According to the illustrated embodiments, the lubrication portion 3 is a portion of the interface between the cutting chain and the guide bar 30'.

Figure 2:
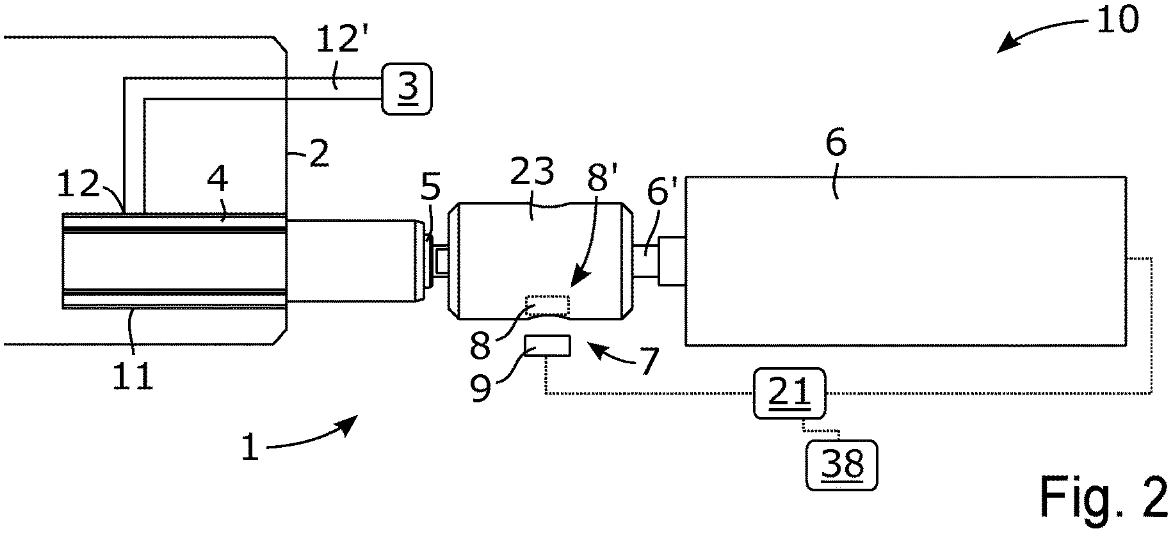
FIG. 2 schematically illustrates a lubrication system of the handheld power tool illustrated in FIG. 1.

FIG. 2 schematically illustrates the lubrication system 10 of the handheld power tool 40 illustrated in FIG. 1. In FIG. 2, the lubrication pump 1 of the lubrication system 10 and part of the lubricant tank 2 are illustrated. Moreover, also the lubrication portion 3 is schematically indicated.

The lubrication pump 1 comprises a pump chamber unit 4. As is further explained herein, the pump chamber unit 4 comprises a pump chamber with an inlet 11 connected to the lubricant tank 2 and an outlet 12 connected to the lubrication portion 3. According to the embodiments illustrated in FIG. 2, at least part of the pump chamber unit 4 protrudes into the lubricant tank 2 such that the inlet 11 arranged on the pump chamber unit 4 is positioned inside the lubricant tank 2. The inlet 11 of the pump chamber unit 4 forms an inlet 11 of the lubrication pump 1 and the outlet 12 of the pump chamber 4' forms an outlet 12 of the lubrication pump 1. In other words, according to the illustrated embodiments, the inlet 11 of the lubrication pump 1 is fluidly connected to an inner volume of the lubricant tank 2 by being positioned inside the inner volume of the lubricant tank 2.

According to the illustrated embodiments, the lubrication system 10 comprises an outlet conduit 12' extending from the outlet 12 of the lubrication pump 1 to the lubrication portion 3. According to further embodiments, the inlet 11 of the lubrication pump 1 may be fluidly connected to the inner volume of the lubricant tank 2 via a conduit. According to such embodiments, the entire pump chamber unit 4 may be arranged outside of the lubricant tank 2.

Figure 3:
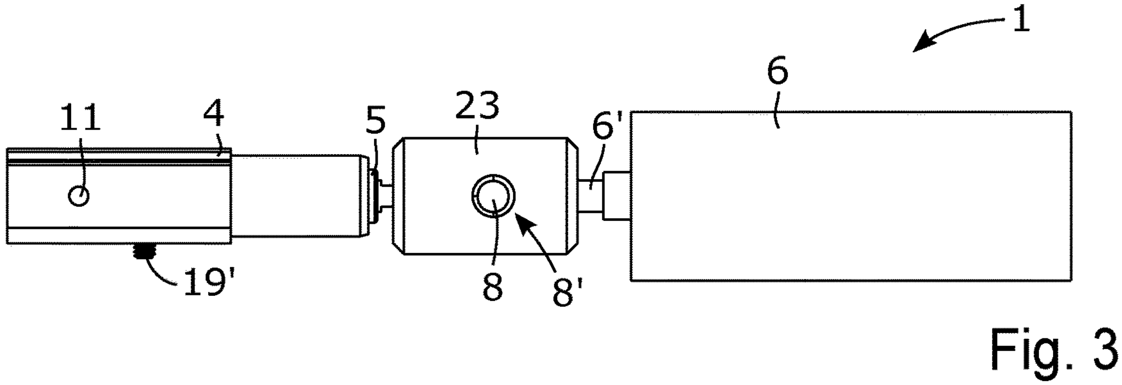
FIG. 3 illustrates a second view of a lubrication pump of the lubrication system illustrated in FIG. 2.

FIG. 3 illustrates a second view of the lubrication pump 1 of the lubrication system 10 illustrated in FIG. 2. In FIG. 3, the lubrication pump 1 can be said to be seen from the side whereas FIG. 2 can be said to illustrate a top view of the lubrication pump 1. In other words, in FIG. 3, the lubrication pump 1 can be said to have been rotated 90 degrees as compared to what is seen in FIG. 2.

In FIG. 2, the inlet 11 of the lubrication pump 1 can be more clearly seen. According to the illustrated embodiments, the inlet 11 of the lubrication pump 1 is formed by a hole in the pump chamber unit 4 extending into the pump chamber of the pump chamber unit 4.

Figure 4:
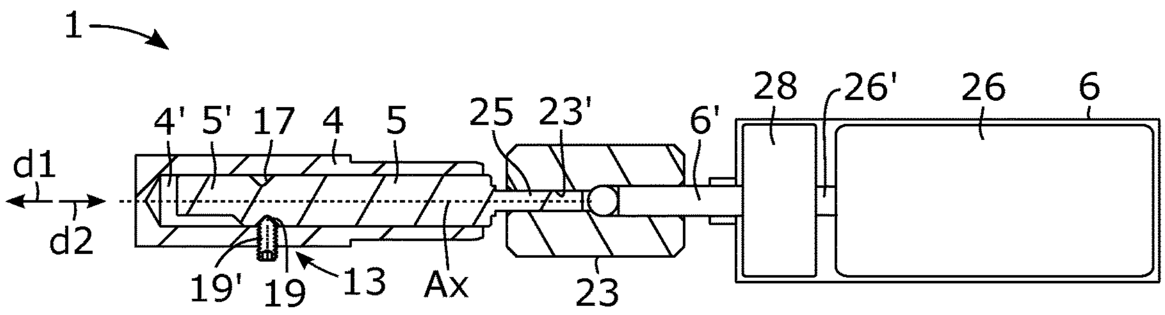
FIG. 4 illustrates a first cross section through the lubrication pump of the lubrication system illustrated in FIG. 2.

FIG. 4 illustrates a first cross section through the lubrication pump 1 of the lubrication system 10 illustrated in FIG. 2. In FIG. 4, the pump chamber 4' of the pump chamber unit 4 is seen. Below, simultaneous reference is made to FIG. 1-FIG. 4, if not indicated otherwise.

As can be seen in FIG. 4, the lubrication pump 1 comprises a pump member 5'. The pump member 5' is arranged inside the pump chamber unit 4 and delimits the pump chamber 4'. Moreover, the lubrication pump 1 comprises an electric motor unit 6. As is further explained herein, the electric motor unit 6 is configured to rotate the pump member 5' relative to the pump chamber unit 4 around a rotation axis Ax such that the pump member 5' pumps lubricant from the inlet 11 to the outlet 12. In FIG. 4, the cross section of the lubrication pump 1 is made in a plane comprising the rotation axis Ax.

In more detail, according to the illustrated embodiments, the lubrication pump 1 comprises a plunger unit 5 comprising the pump member 5'. As is further explained herein, the pump member 5' is a part of the plunger unit 5. The plunger unit 5 is rotationally arranged relative to the pump chamber unit 4 around the rotation axis Ax.

Figure 5:
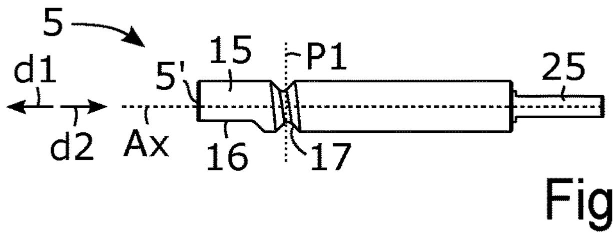
FIG. 5 illustrates a plunger unit of the lubrication pump illustrated in FIG. 2-FIG. 4, FIG. **6*a* illustrates a second cross section through the lubrication pump illustrated in FIG. 2-FIG. 4.

FIG. 5 illustrates the plunger unit 5 of the lubrication pump 1 illustrated in FIG. 2-FIG. 4. According to the illustrated embodiments, the plunger unit 5 is formed by one piece of continuous material. The plunger unit 5 may be formed by one piece of a continuous metal material, such as steel, an aluminium alloy, a magnesium alloy, or the like. As an alternative, the plunger unit 5 may be formed by one piece of a continuous polymeric material, such as polyamide, or the like.

The feature that the plunger unit 5 is formed by one piece of continuous material means that the plunger unit 5 is made in one single piece and that the plunger unit 5 is not broken or assembled from more than one part. The feature that the plunger unit 5 is formed by one piece of continuous material may mean that the plunger unit 5 is monolithic. According to further embodiments, the plunger unit 5 may be formed by an assembly of a number of separate parts.

As is explained in the following, the lubrication pump 1 comprises a mechanism 13 configured to force the plunger unit 5 to reciprocate relative to the pump chamber unit 4 along directions d1, d2 coinciding with the rotation axis Ax upon rotation of the plunger unit 5 relative to the pump chamber unit 4.

According to the illustrated embodiments, the mechanism 13 is formed by a groove 17 on the plunger unit 5 and a protrusion 19 arranged on the pump chamber unit 4, wherein the protrusion 19 protrudes into the groove 17. According to further embodiments, the groove 17 of the mechanism 13 may be arranged on the pump chamber unit 4 and the protrusion 19 of the mechanism 13 may be arranged on the plunger unit 5.

According to the illustrated embodiments, the protrusion 19 is a tip of a screw 19' screwed into the pump chamber unit 4 such that the tip of the screw protrudes into the groove 17. The screw 19' is also seen and indicated in FIG. 3. However, according to further embodiments, the lubrication pump 1 may comprise another type of protrusion protruding into the groove 17 of the mechanism 13. As an example, the protrusion 19 can be an integral part of the pump chamber unit 4, for example formed when moulding and/or machining the pump chamber unit 4. Likewise, the protrusion 19 can be an integral part of the plunger unit 5, for example formed when moulding and/or machining the pump plunger unit 5. As a further alternative, the protrusion 19, as referred to herein, may be formed by a pin, or other type of unit, being press-fitted into the pump chamber unit 4 or into the plunger unit 5.

As is best seen in FIG. 5, the groove 17 is angled relative to a plane P1 perpendicular to the rotation axis Ax. In this manner, a reciprocation motion is obtained of the plunger unit 5 relative to the pump chamber unit 4 along the directions d1, d2 coinciding with the rotation axis Ax upon rotation of the plunger unit 5 relative to the pump chamber unit 4. As a result, a varying volume of the pump chamber 4' is obtained upon rotation of the plunger unit 5 relative to the pump chamber unit 4.

The directions d1, d2 coinciding with the rotation axis Ax can be said to comprise a first direction d1 and a second direction d2, wherein the volume of the pump chamber 4' is decreased when the pump member 5' is moved in the first direction d1 relative to the pump chamber unit 4 and wherein the volume of the pump chamber 4' is increased when the pump member 5' is moved in the second direction d2 relative to the pump chamber unit 4. Upon rotation of the plunger unit 5 around the rotation axis Ax, the mechanism 13 forces the plunger unit 5 to move between a maximum volume position relative to the pump chamber unit 4 and a minimum volume position relative to the pump chamber unit 4. The volume of the pump chamber 4' is maximized when the plunger unit 5 is located at the maximum volume position relative to the pump chamber unit 4 and the volume of the pump chamber 4' is minimized when the plunger unit 5 is located at the minimum volume position relative to the pump chamber unit 4. In FIG. 4, the plunger unit 5 is illustrated as positioned in the minimum volume position relative to the pump chamber unit 4.

Figure 6A:
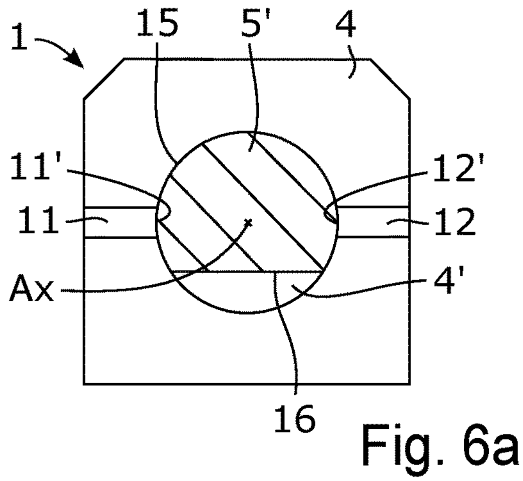
FIG. 6*b* illustrates the second cross section of FIG. 6*a* in which a pump member has been rotated 90 degrees in a clockwise direction relative to the pump chamber unit as compared to in FIG. 6*a*.
FIG. 6*c* illustrates the second cross section of FIG. 6*b* in which the pump member has been rotated 90 degrees in the clockwise direction relative to the pump chamber unit as compared to in FIG. 6*b*.
FIG. 6*d* illustrates the second cross section of FIG. 6*c* in which the pump member has been rotated 90 degrees in the clockwise direction relative to the pump chamber unit as compared to in FIG. 6*c***.

FIG. 6*a* illustrates a second cross section through the lubrication pump 1 illustrated in FIG. 2-FIG. 4. In FIG. 6*a*, the cross section is made in a plane perpendicular to the rotation axis Ax of the pump member 5' at a location of the lubrication pump 1 comprising the pump member 5' and the pump chamber 4' of the lubrication pump 1.

In FIG. 6*a*, the inlet 11 and the outlet 12 of the pump chamber 4' are clearly seen. Moreover, as seen in FIG. 6*a*, according to the illustrated embodiments, the pump chamber unit 4 comprises an inlet port 11' connected to the inlet 11 and an outlet port 12' connected to the outlet 12.

Moreover, as indicated in FIG. 5 and FIG. 6*a*, the pump member 5' comprises a mantle surface 15 configured to cover and uncover the inlet port 11' and the outlet port 12' respectively upon rotation of the pump member 5'. In FIG. 6*a*, the pump member 5' is illustrated at a rotational position relative to the pump chamber unit 4 in which each of the inlet port 11' and the outlet port 12' is covered by the mantle surface 15 of the pump member 5'. In this manner, each of the inlet 11 and the outlet 12 of the lubrication pump 1 is closed when the pump member 5' is at the rotational position relative to the pump chamber unit 4 illustrated in FIG. 6*a*.

Figure 6B:
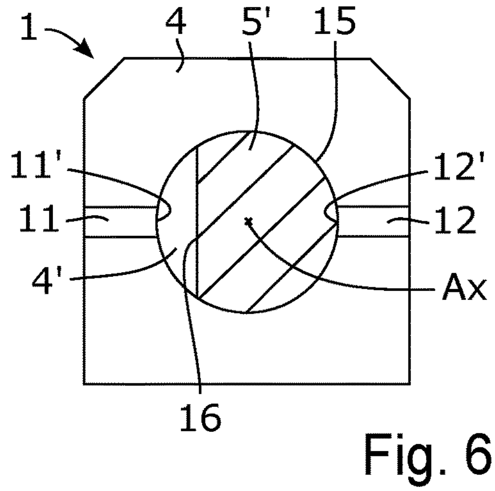

FIG. 6*b* illustrates the second cross section of FIG. 6*a* in which the pump member 5' has been rotated 90 degrees in the clockwise direction relative to the pump chamber unit 4 as compared to in FIG. 6*a*. Below, simultaneous reference is made to FIG. 1-FIG. 6*b*, if not indicated otherwise.

In FIG. 6*b*, the pump member 5' is illustrated at a rotational position relative to the pump chamber unit 4 in which the inlet port 11' is not covered by the mantle surface 15 of the pump member 5' and in which the outlet port 12' is covered by the mantle surface 15 of the pump member 5'.

As indicated in FIG. 5, FIG. 6*a*, and FIG. 6*b*, the pump member 5' comprises a cut-out section 16. The cut-out section 16 forms a delimiting surface of the pump chamber 4'. In more detail, according to the illustrated embodiments, the pump member 5' has a cylindrical shape with the cut-out section 16 provided such that the inlet 11 of the lubrication pump 1 is fluidly connected to the pump chamber 4' via the inlet port 11' when the cut-out section 16 faces the inlet port 11' and such that the outlet 12 of the lubrication pump 1 is fluidly connected to the pump chamber 4' via the outlet port 12' when the cut-out section 16 faces the outlet port 12'.

Moreover, the mechanism 13 of the lubrication pump 1 is provided such that the pump member 5' is moved in the second direction d2 relative to the pump chamber unit 4 referred to above when the cut-out section 16 faces the inlet port 11', i.e., is moved in a direction relative to the pump chamber unit 4 causing an increase in the volume of the pump chamber 4'. In this manner, lubricant, such as oil, can be sucked from the lubricant tank 2 into the pump chamber 4' via the inlet 11 and the inlet port 11' when the pump member 5' is at a rotational position relative to the pump chamber unit 4 illustrated in FIG. 6*b*.

Figure 6C:
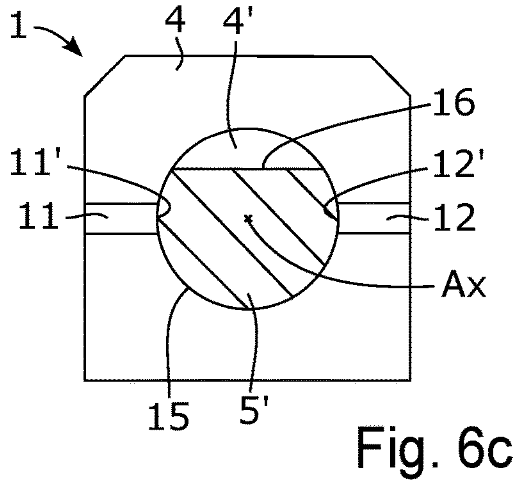

FIG. 6*c* illustrates the second cross section of FIG. 6*b* in which the pump member 5' has been rotated 90 degrees in the clockwise direction relative to the pump chamber unit 4 as compared to in FIG. 6*b*. As seen in FIG. 6*c*, each of the inlet port 11' and the outlet port 12' is covered by the mantle surface 15 of the pump member 5' when the pump member 5' is at this rotational position relative to the pump chamber unit 4.

Figure 6D:
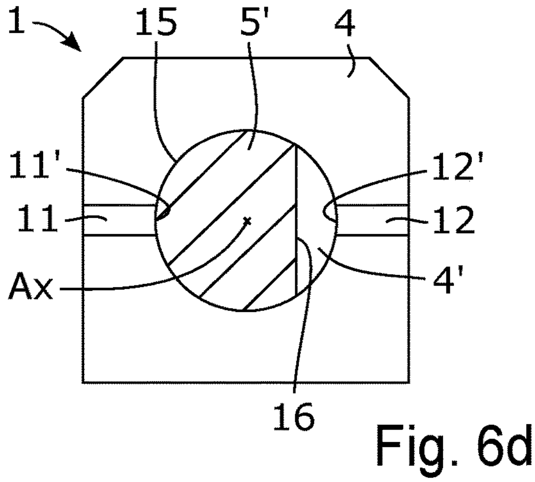

FIG. 6*d* illustrates the second cross section of FIG. 6*c* in which the pump member 5' has been rotated 90 degrees in the clockwise direction relative to the pump chamber unit 4 as compared to in FIG. 6*c*. Below, simultaneous reference is made to FIG. 1-FIG. 6*d*, if not indicated otherwise.

In FIG. 6*d*, the pump member 5' is illustrated at a rotational position relative to the pump chamber unit 4 in which the inlet port 11' is covered by the mantle surface 15 of the pump member 5' and in which the outlet port 12' is not covered by the mantle surface 15 of the pump member 5'. This is because the cut-out section 16 of the pump member 5' faces the outlet port 12' when the pump member 5' is at this rotational position relative to the pump chamber unit 4.

The mechanism 13 of the lubrication pump 1 is provided such that the pump member 5' is moved in the first direction d1 relative to the pump chamber unit 4 referred to above when the cut-out section 16 faces the outlet port 12', i.e., is moved in a direction relative to the pump chamber unit 4 causing a decrease in the volume of the pump chamber 4' when the mantle surface 15 of the pump member 5' is not covering the outlet port 12'. In this manner, lubricant, such as oil, can be pumped from the pump chamber 4' via outlet port 12' and the outlet 12 to the lubrication portion 3 when the pump member 5' is at a rotational position relative to the pump chamber unit 4 illustrated in FIG. 6*b*.

Accordingly, due to the above explained features of the lubrication pump 1, a pumping action is obtained from the lubricant tank 2 to the lubrication portion 3 when the pump member 5' is rotated by the electric motor unit 6 around the rotation axis Ax.

According to the illustrated embodiments, the electric motor unit 6 comprises an electric motor 26 and a gearbox 28. The electric motor 26 may be a brushed electric motor, a brushless electric motor, and/or a stepper motor. According to the illustrated embodiments, the gearbox 28 comprises an epicyclic gear train, also known as a planetary gearset.

According to further embodiments, the gearbox 28 may comprise another type of gearset.

The electric motor 26 comprises an output shaft 26', wherein the gearbox 28 connects the output shaft 26' of the electric motor 26 and an output shaft 6' of the electric motor unit 6. In other words, according to the illustrated embodiments, an output shaft of the gearbox 28 can be said to form an output shaft of the electric motor unit 6.

Moreover, according to the illustrated embodiments, the lubrication pump 1 comprises a connector 23 connecting the output shaft 6' of the electric motor unit 6 and the plunger unit 5. The electric motor 26 of the electric motor unit 6 is thus configured to rotate the pump member 5' via the gearbox 28 and the connector 23. According to further embodiments, the electric motor unit 6 may lack a gearbox 28. According to such embodiments, an output shaft 26' of the electric motor 26 may be directly connected to the pump member 5', for example via a connector 23 as explained herein.

According to the illustrated embodiments, an end section 25 of the plunger unit 5 protrudes into an aperture 23' of the connector 23. The aperture 23' and the end section 25 together form an interface rotationally locking the plunger unit 5 to the connector 23 while allowing movement of the plunger unit 5 relative to the connector 23 along directions d1, d2 coinciding with the rotation axis Ax of the plunger unit 5. In this manner, the plunger unit 5 can be driven to rotate around the rotation axis Ax while movement of the plunger unit 5 is allowed relative to the pump chamber unit 4 and the connector 23 along the directions d1, d2 coinciding with the rotation axis Ax in a simple and efficient manner.

As is explained in the following, according to embodiments herein, the lubrication pump 1 comprises a sensor assembly 7. The sensor assembly 7 is seen in FIG. 2. The sensor assembly 7 is configured to provide data indicative of the rotational position of the pump member 5' relative to the pump chamber unit 4. The handheld power tool 40 further comprises a control arrangement 21 connected to the sensor assembly 7 and to the electric motor unit 6. As is explained in the following, the control arrangement 21 is configured to control operation of the electric motor unit 6 based on the data from the sensor assembly 7.

In more detail, according to the illustrated embodiments, the sensor assembly 7 comprises a sensor 9 configured to sense the magnitude of a magnetic field and a magnet 8. According to the illustrated embodiments, the magnet 8 is arranged on a portion 8' of the lubrication pump 1 which is arranged to rotate with the pump member 5'. In more detail, as is seen in FIG. 2 and FIG. 3, according to the illustrated embodiments, the portion 8' of the lubrication pump 1 is a portion 8' of the connector 23. Moreover, according to the illustrated embodiments, the sensor 9 is a Hall effect sensor, i.e., a type of sensor which detects the presence and magnitude of a magnetic field using the Hall effect.

An output voltage of the sensor 9 is proportional to the strength of a magnetic field at the location of the sensor 9. The magnet 8 is arranged on the connector 23 at a radial distance from a rotation axis of the connector 23. According to the illustrated embodiments, the rotation axis of the connector 23 coincides with the rotation axis Ax of the plunger unit 5. Thereby, the output voltage of the sensor 9 will vary upon rotation of the connector 23. Since the plunger unit 5 is rotationally locked to the connector 23, the output voltage of the sensor 9 will vary upon rotation of the plunger unit 5 and the pump member 5' thereof around the rotation axis Ax. In this manner, the sensor assembly 7 provides data indicative of the rotational position of the pump member 5' relative to the pump chamber unit 4.

As understood from the above, according to the illustrated embodiments, the sensor assembly 7 is arranged outside of the electric motor unit 6. However, according to further embodiments, the sensor assembly 7 may be fully or partially integrated in the electric motor unit 6.

According to some embodiments, the control arrangement 21 is configured to determine a current rotational speed of the pump member 5' using the data from the sensor assembly 7 upon rotation of the pump member 5'. The control arrangement 21 may determine the current rotational speed of the pump member 5' by monitoring a frequency at which the output voltage of the sensor 9 varies.

The control arrangement 21 may be configured to obtain a desired rotational speed of the pump member 5' and control a power output of the electric motor unit 6 such that the rotational speed of the pump member 5' is controlled towards the desired rotational speed of the pump member 5'. According to these embodiments, the control arrangement 21 may be configured to increase the power output of the electric motor unit 6 in case the current rotational speed is below the desired rotational speed and is configured to reduce the power output of the electric motor unit 6 in case the current rotational speed is above the desired rotational speed.

Due to these features, an accurate control of the electric motor unit 6 and thus also of the pumping rate of lubricant delivered by the lubrication pump 1 is obtained. Accordingly, in this manner, too high or too low flowrates of lubricant delivered to the lubrication portion 3 can be avoided during operation of the handheld power tool. Moreover, conditions are provided for obtaining a more consistent flowrate of lubricant from the lubrication pump 1 to the lubrication portion 3 being less dependent on a current viscosity of the lubricant.

The control arrangement 21 may be configured to regulate the output power of the electric motor unit 6 using pulse-width modulation (PWM) also known as pulse-duration modulation (PDM). Moreover, as understood from the above, the control arrangement 21 may be configured to regulate the output power of the electric motor unit 6 by regulating electric quantities of electricity supplied to the electric motor 26 of the electric motor unit 6. The control arrangement 21 may utilize a proportional-integral-derivative controller, also known as PID controller, in the control of the power output of the electric motor unit 6.

According to some embodiments, the control arrangement 21 is configured to obtain at least one parameter indicative of a current lubrication need of the tool 30 and determine the desired rotational speed of the pump member 5' based on the obtained at least one parameter. The at least one parameter may be indicative of a current operational condition of the power source 38 of the handheld power tool 40. The current operational condition of the power source 38 of the handheld power tool 40 may comprise one or more of a rotational speed of an output shaft of the power source 38, a current throttle position of the power source 38, and a current power generated by the power source 38, or the like.

In this manner, an accurate control of the lubrication of the tool 30 of the handheld power tool 40 is provided based on the current lubrication need of the tool 30. Moreover, it can be ensured that too high or too low flowrates of lubricant delivered to the lubrication portion 3 is avoided during operation of the handheld power tool 40.

According to some embodiments, the control arrangement 21 is configured to, upon receipt of a stop demand of the lubrication pump 1, control the electric motor unit 6 to rotate the pump member 5' to assume an angle relative to the pump chamber unit 4 being within a predetermined angle interval. The angle interval of the pump member 5' relative to the pump chamber unit 4 may be determined such that the mantle surface 15 of the pump member 5' covers the inlet port 11' when the pump member 5' is at an angle relative to the pump chamber unit 4 being within the predetermined angle interval.

In this manner, it can be ensured that leakage of lubricant from the handheld power tool 40 via the lubrication pump 1 is avoided in an efficient manner when storing the handheld power tool 40. That is, studies have shown that leakage of lubricant through a lubrication pump 1 usually occurs when the inlet port 11' of the lubrication pump 1 is open, i.e., is uncovered.

Thus, by controlling the electric motor unit 6 to rotate the pump member 5' to assume an angle relative to the pump chamber unit 4 in which the mantle surface 15 of the pump member 5' covers the inlet port 11', such leakages of lubricant can be avoided.

As understood from the above, the pump member 5' is illustrated at an angle relative to the pump chamber unit 4 being within such a predetermined angle interval in FIG. 6*a*, FIG. 6*c*, and FIG. 6*d*. The control arrangement 21 may be configured to control the electric motor unit 6 to rotate the pump member 5' to assume an angle relative to the pump chamber unit 4 being within the predetermined angle interval by continue to supply electricity to the electric motor 26 of the electric motor unit 6 after receiving the stop demand until the data received from the sensor assembly 7 indicates that the pump member 5' is at a determined rotational position, i.e. angle, relative to the pump chamber unit 4.

However, according to some embodiments, the control arrangement 21 may be configured to, upon receipt of the stop demand, reduce the rotational speed of the pump member 5' to a determined rotational speed by controlling the electric motor 26 of the electric motor unit 6 and then stop an electrical supply to the electric motor 26 of the electric motor unit 6 when the data received from the sensor assembly 7 indicates that the pump member 5' is at a determined rotational position, i.e. angle, relative to the pump chamber unit 4.

The stop demand may be received from an input unit arranged on the handheld power tool 40 used for stopping the power source 38 of the handheld power tool 40. Such an input unit may for example comprise a button, a lever, or the like, arranged on the handheld power tool 40, for example at a location on or adjacent to the first handle 33 of the handheld power tool 40. As an alternative, or in addition, a stop demand may be generated and received in the control arrangement 21 when one or both of the throttle actuator 35 and the safety actuator 36 is/are released.

One skilled in the art will appreciate that the control arrangement 21 may be configured to use programmed instructions when controlling operation of the electric motor 26 based on the data from the sensor assembly 7. These programmed instructions are typically constituted by a computer program, which, when it is executed in the control arrangement 21, ensures that the control arrangement 21 carries out the control. The computer program may be part of a computer program product which comprises a suitable digital storage medium on which the computer program is stored.

The control arrangement 21 may comprise a calculation unit which may take the form of substantially any suitable type of processor circuit or microcomputer, e.g., a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 21 may comprise a calculation unit which may take the form of substantially any suitable type of processor circuit or microcomputer, e.g., a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

Moreover, the control arrangement 21 of the handheld power tool 40 may comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis.

According to some embodiments, the memory unit may comprise integrated circuits comprising silicon-based transistors. The memory unit may comprise e.g., a memory card, a flash memory, a USB memory, a hard disc, or another similar volatile or non-volatile storage unit for storing data such as e.g., ROM (Read-Only Memory), PROM (Programmable Read-Only Memory), EPROM (Erasable PROM), EEPROM (Electrically Erasable PROM), etc. in different embodiments.

The control arrangement 21 is connected to components of the handheld power tool 40 for receiving and/or sending input and output signals, such as the sensor 9 of the sensor assembly 7, the electric motor 26 of the electric motor unit 6, the power source 38, and a control arrangement of the power source 38. These input and output signals may comprise waveforms, pulses, or other attributes which the input signal receiving devices can detect as information and which can be converted to signals processable by the control arrangement 2. These signals may then be supplied to the calculation unit.

One or more output signal sending devices may be arranged to convert calculation results from the calculation unit to output signals for conveying to other parts of the control system of the handheld power tool 40 and/or the component or components for which the signals are intended. Each of the connections to the respective components of the handheld power tool 40 for receiving and sending input and output signals may take the form of one or more from among a conductor on a printed circuit board, a cable, a data bus, or a wireless connection.

In the embodiments illustrated, the handheld power tool 40 comprises a control arrangement 21 but might alternatively be implemented wholly or partly in two or more control arrangements.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A handheld power tool comprising a power source configured to power a tool of the handheld power tool and a lubrication system, wherein the lubrication system comprises a lubricant tank and lubrication pump configured to pump lubricant from the lubricant tank to a lubrication portion to lubricate the tool, and wherein the lubrication pump comprises:

a pump chamber unit comprising a pump chamber with an inlet connected to the lubricant tank and an outlet connected to the lubrication portion, a pump member arranged inside the pump chamber unit, and an electric motor unit configured to rotate the pump member relative to the pump chamber unit such that the pump member pumps lubricant from the inlet to the outlet, and wherein the handheld power tool further comprises a sensor assembly configured to provide data indicative of the rotational position of the pump member relative to the pump chamber unit.

2. The handheld power tool according to claim 1, wherein the handheld power tool further comprises a control arrangement connected to the sensor assembly and to the electric motor unit, and wherein the control arrangement is configured to control operation of the electric motor unit based on the data from the sensor assembly.

3. The handheld power tool according to claim 2, wherein the control arrangement is configured to:

determine a current rotational speed of the pump member using the data from the sensor assembly upon rotation of the pump member, obtain a desired rotational speed of the pump member, and control a power output of the electric motor unit such that the rotational speed of the pump member is controlled towards the desired rotational speed of the pump member.

4. The handheld power tool according to claim 3, wherein the control arrangement is configured to increase the power output of the electric motor unit in case the current rotational speed is below the desired rotational speed and is configured to reduce the power output of the electric motor unit in case the current rotational speed is above the desired rotational speed.

5. The handheld power tool according to claim 3, wherein the control arrangement is configured to:

obtain at least one parameter indicative of a current lubrication need of the tool, and determine the desired rotational speed of the pump member based on the obtained at least one parameter.

6. The handheld power tool according to claim 5, wherein the at least one parameter is indicative of a current operational condition of the power source of the handheld power tool.

7. The handheld power tool according to claim 2, wherein the control arrangement is configured to, upon receipt of a stop demand of the lubrication pump, control the electric motor unit to rotate the pump member to assume an angle relative to the pump chamber unit being within a predetermined angle interval.

8. The handheld power tool according to claim 7, wherein the pump chamber unit comprises an inlet port connected to the inlet and an outlet port connected to the outlet, and wherein the pump member comprises a mantle surface configured to cover and uncover the inlet port and the outlet port respectively upon rotation of the pump member.

9. The handheld power tool according to claim 8, wherein the mantle surface of the pump member is configured to cover the inlet port when the pump member is at an angle relative to the pump chamber unit being within the predetermined angle interval.

10. The handheld power tool according to claim 1, wherein the lubrication pump comprises a plunger unit comprising the pump member, and wherein the plunger unit is rotationally arranged relative to the pump chamber unit around a rotation axis, and wherein the lubrication pump comprises a mechanism configured to force the plunger unit to reciprocate relative to the pump chamber unit along directions coinciding with the rotation axis upon rotation of the plunger unit relative to the pump chamber unit.

11. The handheld power tool according to claim 10, wherein the mechanism is formed by a groove on one of the plunger unit and the pump chamber unit and a protrusion arranged on the other of the plunger unit and the pump chamber unit, wherein the protrusion protrudes into the groove, and wherein the groove is angled relative to a plane perpendicular to the rotation axis.

12. The handheld power tool according to claim 10, wherein the lubrication pump comprises a connector connecting an output shaft of the electric motor unit and the plunger unit.

13. The handheld power tool according to claim 12, wherein an end section of the plunger unit protrudes into an aperture of the connector, and wherein the aperture and the end section together form an interface rotationally locking the plunger unit to the connector while allowing movement of the plunger unit relative to the connector along directions coinciding with the rotation axis of the plunger unit.

14. The handheld power tool according to claim 13, wherein the sensor assembly comprises a sensor configured to sense the magnitude of a magnetic field and a magnet arranged on a portion of the lubrication pump, and wherein the portion of the lubrication pump is arranged to rotate with the pump member.

15. The handheld power tool according to claim 14, wherein the portion of the lubrication pump is a portion of the connector.

16. The handheld power tool according to claim 14, wherein the sensor is a Hall effect sensor.

17. The handheld power tool according to claim 1, wherein the electric motor unit comprises an electric motor and a gearbox, and wherein the gearbox connects an output shaft of the electric motor and an output shaft of the electric motor unit.

18. The handheld power tool according to claim 1, wherein the handheld power tool is a chainsaw or a hedge trimmer.

* * * * *